United States Patent [19]

Merten

[11] 4,351,414
[45] Sep. 28, 1982

[54] LUBRICANT FITTING

[75] Inventor: Jeff L. Merten, Rosenberg, Tex.

[73] Assignee: ACF Industries, Incorporated, New York, N.Y.

[21] Appl. No.: 156,899

[22] Filed: Jun. 6, 1980

[51] Int. Cl.$^3$ .................. F01M 1/18; F16N 21/06
[52] U.S. Cl. .................. 184/105 B; 184/6.4; 137/614.13
[58] Field of Search ........... 184/105 B, 105 C, 105 R, 184/6.4; 137/614.12, 614.13, 614.11, 322; 251/83

[56] References Cited

U.S. PATENT DOCUMENTS

| | | | |
|---|---|---|---|
| 1,925,958 | 9/1933 | Giles | 137/614.13 X |
| 2,217,739 | 10/1940 | Ehats | 184/105 B |
| 2,559,268 | 7/1951 | Wyckoff | 137/614.13 |
| 3,075,541 | 1/1963 | Hajek | 137/614.13 X |
| 3,605,948 | 9/1971 | Wynn | 184/6.4 |

*Primary Examiner*—David H. Brown
*Attorney, Agent, or Firm*—Stephen T. Belsheim; Marvin J. Marnock; Eugene N. Riddle

[57] ABSTRACT

A lubricant fitting (10) adapted to be detachably connected to a valve body (11). The lubricant fitting (10) includes an elongate body (12) that has a central bore (24) therethrough which has an intermediate bore portion (26) that joins opposite inner and outer bore end portions (28 and 30) of an enlarged diameter. Inner and outer annular seats (32 and 34) are formed at the junctures of the intermediate bore portion (26) and the inner and outer bore end portions (28 and 30), respectively. An elongate valve member (50) is mounted within the central bore (24) and has inner and outer valve elements (52 and 54) which have inner and outer shoulders (64 and 86), respectively. The inner and outer annular shoulders (64 and 86) are in opposed facing relationships to the inner and outer annular seats (32 and 34), respectively. A threaded connection (92) exists between the inner and outer valve elements (52 and 54), and allows the inner and outer valve elements (52 and 54) to move longitudinally relative to each other upon the relative rotational movement between themselves to selectively place the inner and outer bore end portions (28 and 30) in fluid isolation so that the lubricant fitting (10) provides an adequate seal between the interior of the valve body (11) and atmosphere at all normal operating pressures within the valve body (11).

8 Claims, 4 Drawing Figures

LUBRICANT FITTING

BACKGROUND OF THE INVENTION

The invention relates to lubricant fittings adapted to be connected to a valve body, and in particular, to a lubricant fitting of the back seat type.

Heretofore, in high pressure situations (e.g. 20,000 psi), the use of lubricant fittings of the back seat type have proven satisfactory for injecting lubricant material into the interior of the valve body. These lubricant fittings have also provided an adequate seal when the pressure in the interior of the valve body is above a predetermined level (e.g. 50 psi). U.S. Pat. No. 3,605,948 issued to Wynn on Sept. 20, 1971, is exemplary of these earlier lubricant fittings which are adapted to be connected to a valve body. However, these lubricant fittings do not have satisfactory sealing characteristics when the pressure in the interior of the valve body is lower than approximately 50 psi. The inability of these lubricant fittings to seal at low pressures is of great concern, especially in critical service applications where hydrogen sulfide is present. Thus, it would be highly desirable to provide an improved lubricant fitting that performs effectively by providing adequate sealing characteristics at low pressures (e.g. 50 psi or less) as well as at high pressures (e.g. 20,000 psi). It would also be highly desirable if this improved lubricant fitting could be mechanically sealed to insure that regardless of the pressure in the interior of the valve body the lubricant fitting will adequately seal.

SUMMARY OF THE INVENTION

Thus, it is an object of the invention to provide an improved lubricant fitting that has effective sealing characteristics at low pressures e.g. 50 psi or less) as well as at high pressures (e.g. 20,000 psi). It is also an object of the invention to provide an improved lubricant fitting that can be mechanically sealed to insure the sealing integrity of the fitting regardless of the pressure within the interior of the valve body.

The invention is a lubricant fitting adapted to be connected to a valve body. The lubricant fitting comprises an elongate body having a central bore therethrough. The central bore has an intermediate bore portion that joins opposite inner and outer bore end portions. Inner and outer annular seats are formed at the respective junctures of the inner and outer end bore portions with the intermediate bore portion. The inner bore portion is in continuous communication with the interior of the valve body.

An elongate valve member is mounted within the central bore. The elongate valve member has an intermediate section which joins opposite inner and outer end sections. The inner and outer end sections of the elongate valve member have respective inner and outer annular shoulders which are in opposed facing relationship to their corresponding inner and outer annular seats. A threaded connection exists between the inner and outer end sections, and it allows these end sections to move longitudinally relative to each other upon the relative rotational movement therebetween to selectively place the opposite end bore portions in fluid isolation so that the lubricant fitting provides an adequate seal between the interior of the valve body and atmosphere at all normal operating pressures within the valve body.

DETAILED DESCRIPTION OF A SPECIFIC EMBODIMENT

Figures 1, 2:
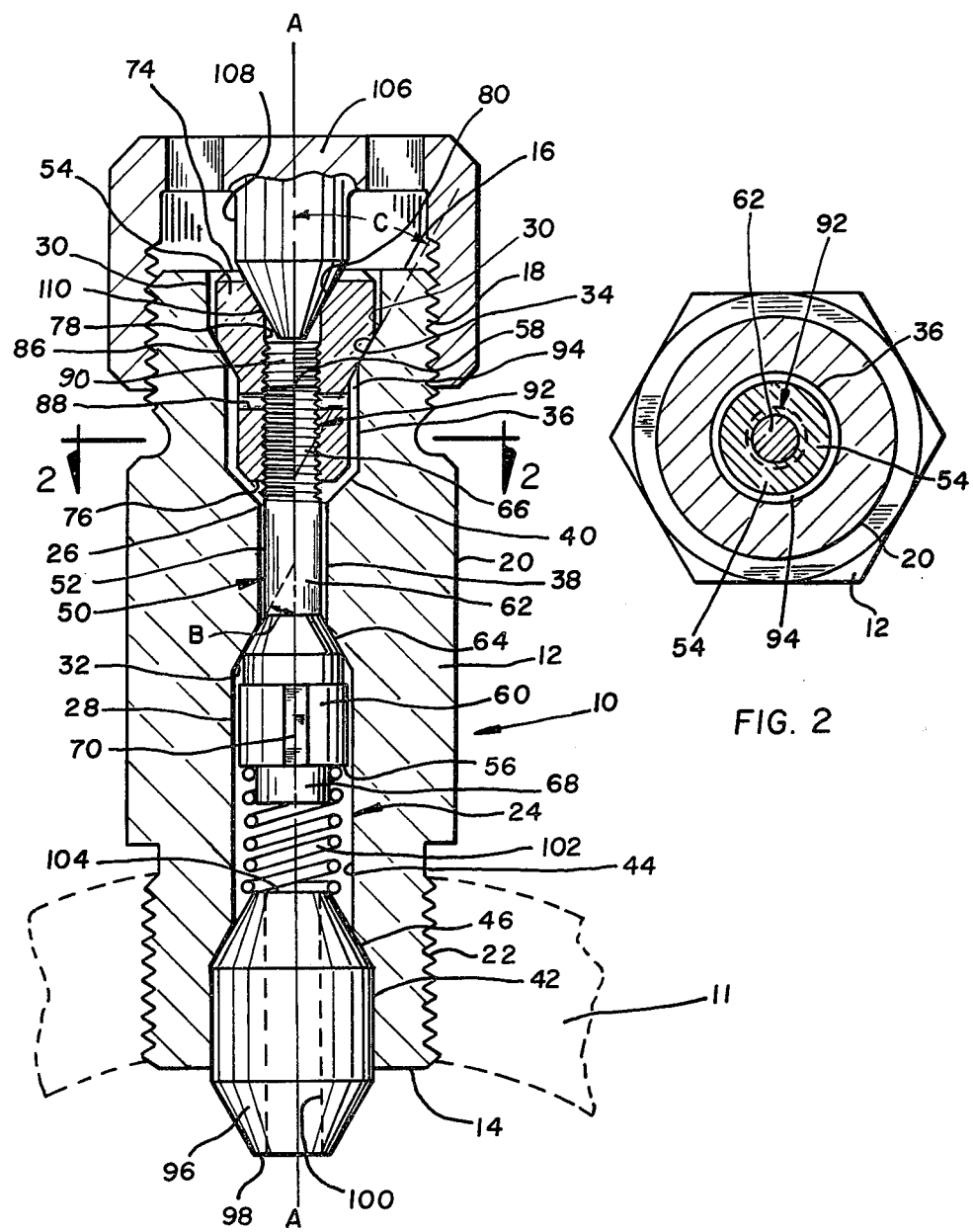
FIG. 1 is a partial sectional view of the lubricant fitting with elongate body, safety cap, outer end section of the elongate valve member, and a portion of the valve body (dashed lines) shown in section, and the remainder of the lubricant fitting shown in plan.
FIG. 2 is a sectional view of the lubricant fitting of FIG. 1 taken along section line 2—2.

Referring to FIGS. 1–4, there is illustrated a lubricant fitting generally designated at 10 which is connected to a valve body 11. Lubricant fitting 10 includes an elongate body 12 that has inner and outer ends 14 and 16. A first set of threads 18 is cut in the exterior surface 20 of body 12 adjacent outer end 16, and a second set of threads 22 is cut in the exterior surface 20 of body 12 adjacent inner end 14.

A central bore 24 passes through elongate body 12. Central bore 24 has an intermediate bore portion 26 located approximately midway between the inner and outer ends of elongate body 12, and opposite inner and outer bore portions 28 and 30. Inner and outer bore portions 28 and 30 respectively, join bore portion 28 and 36, and form inner and outer annular seats 32 and 34 at their respective junctures. Inner annular seat 32 faces towards inner end 14 of body 12, and is disposed from the central axis A—A of central bore 24 at an angle equal to "B" which is within the range of between approximately fifteen degrees (15°) and approximately sixty degrees (60°). Outer annular seat 34 faces towards outer end 16 of body 12, and is disposed from the central axis A—A of central bore 24 at an angle "C" which is within the range of approximately fifteen degrees (15°) and approximately sixty degrees (60°). In practice, it is preferable that angles "B" and "C" are equal and that they both are equal to approximately thirty degrees (30°). Intermediate bore portion 26 is comprised of a relatively larger sized diameter portion 36 that joins outer bore portion 30, and a relatively smaller sized diameter portion 38 that joins inner bore portion 28. The relatively larger and smaller sized diameter portions of intermediate bore portion 26 are joined by a first frusto conical surface 40. Inner bore portion 28 also includes a relatively larger sized diameter portion 42 which is located adjacent inner end 14 of body 12, and a relatively smaller sized diameter portion 44 which is joined to intermediate bore portion 26 by a second frusto-conical surface 46.

An elongate valve member 50 is mounted within central bore 24. Elongate valve member 50 includes an inner valve element 52 and an outer valve element 54.

Inner valve element 52 has opposite inner and outer ends 56 and 58, and includes an enlarged diameter portion 60 adjacent inner end 56 thereof, and a reduced diameter portion 62 extending from enlarged diameter portion 60 to outer end 58 thereof. An inner annular shoulder 64 joins the reduced and enlarged diameter portions of inner valve element 52. Inner annular shoulder 64 is generally parallel to and is in an opposed facing relationship to inner annular seat 32. A third set of threads 66 is cut in reduced diameter portion 62 of inner valve element 52 adjacent outer end 58 thereof. A cylindrical projection 68 extends inwardly toward the valve body from inner end 56 of inner valve element 52. A pair of oppositely disposed longitudinal slots 70 extend along a portion of enlarged diameter portion 60 of inner valve element 52.

Outer valve element 54 has opposite ends 74 and 76, and a central bore 78 therethrough. Central bore 78 flares radially outward adjacent one end 74 of outer valve element 54 to form a frusto-conical shaped nipple receptor 80. Outer valve element 54 has an enlarged diameter portion 82 adjacent one end 74 thereof, and a reduced diameter portion 84 adjacent other end 74 thereof. The enlarged and reduced diameter portions of outer valve element 54 are joined by an outer annular shoulder 86. Outer annular shoulder 86 is generally parallel to and in an opposed facing relationship to outer annular seat 34. Reduced diameter portion 84 of outer valve element 54 has a pair of oppositely disposed ports 88 therein that place central bore 78 of outer valve element 54 in communication with the exterior surface of outer valve element 54. Central bore 78 also has a fourth set of threads 90 cut therein. These third and fourth sets of threads together form a threaded connection generally designated as 92 between the inner and outer valve elements.

Inner valve element 52 is inserted into central bore 24 through inner end 14 of elongate body 12, and outer valve element 54 is inserted into central bore 24 through outer end 16 of elongate body 12. The inner and outer valve elements are threadedly connected at threaded connection 92 for longitudinal movement relative to one another upon the relative rotational movement therebetween. Inner and outer valve elements 52 and 54 are dimensioned with respect to and positioned coaxially with interior bore portion 26 so that an annular space 94 exists between elongate valve member 50 and the intermediate bore portion of central bore 24.

A nose seal 96 is mounted within inner bore portion 28 so as to be contiguous with larger sized diameter portion 42 and second frusto-conical surface 46. The inner end 98 of nose seal 96 extends from inner end 14 of elongate valve body 12. Nose seal 96 has a central passageway 100 passing therethrough. When lubricant fitting 10 is connected to the valve body, central passageway 100 of nose seal 96 places inner bore portion 28 in continuous communication with the interior of the valve body. One end of a spring 102 is affixed to projection 68 extending from inner end 56 of inner valve element 52, and the other end of spring 102 is affixed to the outer end 104 of nose seal 96 so that spring 102 continuously urges inner valve element 52 outwardly of the valve body so as to seat inner annular shoulder 64 on inner annular seat 32 of central bore 24.

A safety cap 106 is threadedly connected to elongate body 12 at outer end 16 thereof. Safety cap 106 includes an inwardly disposed projection 108 that has an annular seating surface 110 at the distal end thereof. Annular seating surface 110 is received by nipple receptor 80 to create a seal therebetween when safety cap 106 is properly connected to elongate body 12.

FIG. 1 illustrates lubricant fitting 10 in a so-called fully sealing position. When in its fully sealing position, lubricant fitting 10 provides an effective seal between the interior of the valve body and the external environment at all ranges of normal operating pressures within the valve body. The lubricant fitting may be placed in its fully sealing position by rotating outer valve element 54 in one direction relative to inner valve element 52 which causes the inner and outer valve elements to longitudinally move toward each other thereby mechanically creating a tight seal between inner annular seat and shoulder 32 and 64, and outer annular seat and shoulder 34 and 86. The magnitude of the sealing force is directly proportional to the amount of torque exerted on the outer valve element. However, it can be appreciated that too much torque exerted on outer valve element 54 could possibly result in permanent damage to the lubricant fitting.

Further, when the lubricant fitting is in the fully sealing position, a seal is created at the abutment between projection 108 of safety cap 106 and nipple receptor 80. In addition, outer valve element 54 is threaded on threaded connection 92 a sufficient distance so that reduced diameter portion 62 of inner valve element 52 blocks ports 88 from placing central bore 78 in communication with the exterior surface of outer valve element 54. Spring 102 and any pressure within the interior of the valve body passing through central passageway 100 of nose seal 96 also assists to firmly seat inner annular shoulder 64 on inner annular seat 32. It can be appreciated that there exists several independently functioning locations within the lubricant fitting that act to maintain the sealing ability of the lubricant fitting at all ranges of normal operating pressures within the valve body.

Figure 3:
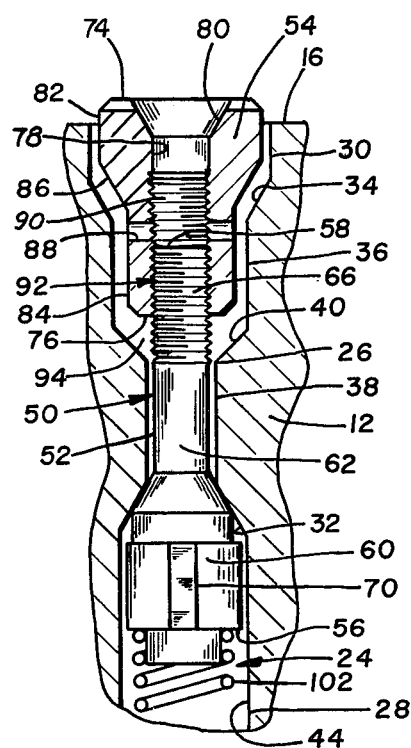
FIG. 3 is a partial view of that of FIG. 1, but with the safety cap removed from the elongate body and the elongate valve member in a lubricating ready position.

In order to inject lubricant into the valve body, lubricant fitting 10 must be placed in a so-called lubricating ready position. After safety cap 106 is removed, outer valve element 54 is rotated in the other direction relative to inner valve element 52 until reduced diameter portion 62 of inner valve element 52 no longer blocks ports 88 as illustrated in FIG. 3. Although outer annular shoulder 86 is spaced apart from outer annular seat 34 so that the seal therebetween is broken, the sealing integrity of the lubricant fitting remains intact since inner annular shoulder 64 is still seated on inner annular seat 32.

A lubricant injector generally designated at 116 may be threadedly connected to outer end 16 of elongate body 12 via a fifth set of threads 112 which cooperate with first set of threads 18. Lubricant injector 116 is threaded to the lubricant fitting a sufficient distance so that nipple 114 abuts nipple receptor 80, and forces elongate valve member 50 towards the valve body until outer annular shoulder 86 is firmly seated on outer annular seats 34 and inner annular shoulder 64 is spaced apart from inner annular seat 32. Lubricant fitting 10 is now in a so-called lubricating position.

Figure 4:
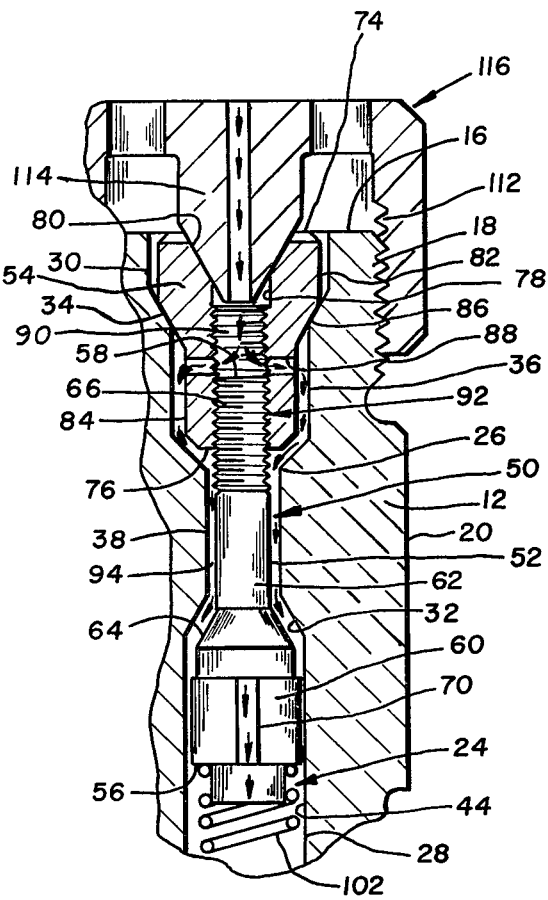
FIG. 4 is a similar view to that of FIG. 3, but with the lubricant injector connected to the elongate body and the elongate valve member in a lubricating position whereby lubricant material is injected into the interior of the valve body.

Lubricant material may be injected through nipple 114 and into outer valve element 54 as illustrated by the arrows in FIG. 4. Lubricant enters central bore 78 and passes through ports 88 into annular space 94 defined as existing between elongate valve member 50 and the intermediate bore portion of central bore 24. Lubricant material then passes through the annular spaces defined between the inner annular shoulder and seat, and by the portion of inner valve element 52 adjacent outer end 58 thereof and inner bore portion 28. Finally, the lubricant material passes through longitudinal slots 70 into the space defined between nose seal 96 and inner valve element 52, and through central passageway 100 of nose seal 96 into the interior of the valve body. Once the proper amount of lubricant material has been injected, the lubricant injector can be removed and the lubricant fitting can be placed in its sealing position.

As lubricant injector 116 is threaded off elongate valve body 12, spring 102 and any pressure acting on inner valve element 52 successfully urges inner valve element 52 towards its seated position so that inner annular shoulder 64 seats against inner annular seat 32. Once lubricant injector has been completely removed from elongate body 12, the lubricant fitting is in a condition like that illustrated in FIG. 3.

Outer valve element 54 is now rotated in another direction relative to inner valve element 52 and inner valve element 54 moves longitudinally toward inner valve element 52 until outer annular shoulder 86 is firmly seated against outer annular seat 34, and inner annular shoulder 64 is firmly seated against inner annular seat 32, even if it is already in this position due to the action of spring 102 and pressure from the valve body. Generally, when the pressure within the valve body is sufficiently high (e.g. at least 50 psi), inner annular shoulder 64 is firmly seated on inner annular seat 32; and thus, no rotation of the outer valve element 54 is necessary to create an adequate seal between the inner annular seat and shoulder. However, if the internal pressure of the valve body is not sufficiently high (e.g. less than 50 psi), the rotation of the outer valve element 54 is needed to firmly seat inner annular shoulder 64 on inner annular seat 32 and create an effective seal therebetween.

Thus, it can be seen that the threaded connection between the inner and outer valve elements provides a number of important features that are vital to the successful operation of applicant's lubricant fitting. Applicant is able to move the outer valve element from its sealing to its lubricating ready position without disturbing the inner valve element, and thereby maintains the sealing integrity of the lubricant fitting. Applicant is also able to mechanically seal the lubricant fitting regardless of the pressure conditions within the valve body.

Finally, once the inner and outer valve elements have been firmly seated in their corresponding annular seats, safety cap 106 is threadedly connected to elongate body 12. Safety cap 106 is threaded a sufficient distance so that an effective seal is created between annular seating surface 110 of projection 108 and nipple receptor 80.

I claim:

1. A lubricant fitting adapted to be connected to a valve body comprising:
   an elongate body having a central bore therethrough, said central bore having an intermediate bore portion and opposite bore end portions of enlarged diameters joined by said intermediate bore portion;
   an annular seat formed at the juncture of each of said end bore portions with said intermediate bore portion;
   an elongate valve member mounted within said central bore having an intermediate section and opposite end sections joined by said intermediate section, each of said end sections having an annular shoulder in an opposed facing relationship to its corresponding said annular seat; and
   a threaded connection between said end sections for allowing said end sections to move longitudinally relative to each other upon the relative rotational movement between said end sections to selectively place said opposite end bore portions in fluid isolation.

2. The lubricant fitting of claim 1 further comprising:
   a safety cap detachably connected to an end of said elongate body remote from the valve body, said safety cap engaging said end section of said elongate valve member remote from the valve body to create a sealing relationship therebetween.

3. The lubricant fitting of claim 1 further comprising:
   a means, mounted in said end bore portion near the valve body, for continuously urging said end section of said elongate valve member near the valve body into a sealing relationship with its corresponding said annular seat.

4. The lubricant fitting of claim 1 further comprising:
   a spring biasing means mounted in said bore end portion nearest the valve body for continuously urging the end section of said elongate valve member nearest the valve body into a sealing relationship with its corresponding adjacent annular seat in said valve member bore, said end section of said elongate valve member remote from the valve body including a nipple receptor at its outer end for receiving the nipple of a fluid injector when the lubricant fitting is connected to a valve body and said remote end section being provided with an internally threaded axial bore extending therethrough and a lateral port communicating with said axial bore, said intermediate section of the elongate valve member being of lesser diameter than said intermediate bore portion and provided with external threads for threaded connection in the axial bore of said remote end section whereby said intermediate section of the valve body is selectively axially movable with respect to said remote end section by means of said threaded connection between a first position wherein said nipple receptor is not in fluid communication with said intermediate bore section and a second position wherein said nipple receptor is in fluid connection with said intermediate bore section and said lubricant fitting is in a lubricating ready condition.

5. The lubricant fitting of claim 4 wherein said spring biasing means includes a nose seal mounted in said end bore portion nearest the valve body and having a bore therethrough communicating the interior of the valve body with said central bore of said elongate body and a spring compressively contained between said nose seal and said near end section of said elongate valve member whereby said spring and fluid pressure in said valve body acts on said near end section with biasing forces to continuously urge it outwardly into sealing relationship with its corresponding annular seat and said elongate valve member when in its lubricating ready condition is movable inwardly by an external force opposed to and exceeding said biasing forces to unseat said near end section from its sealing relationship with its corresponding annular seat and place said lubricant fitting in a lubricating position whereby said nipple receptor fluidly communicates with the interior of said valve body.

6. A lubricant fitting adapted to be connected to a valve body comprising:
   an elongate body having a central bore therethrough, said central bore having an intermediate bore portion and opposite inner and outer bore end portions of an enlarged diameter joined by said intermediate bore portion;

respective inner and outer annular seats formed at the junctures of said inner and outer bore end portions with said intermediate bore portion;

an inner valve element mounted within said intermediate bore portion having opposite inner and outer ends, said inner end of said inner valve element being of an enlarged diameter and having an inner annular shoulder in an opposed facing relationship with said inner annular seat;

an outer valve element mounted within said outer end bore portion being of an enlarged diameter and having an outer annular shoulder in an opposed facing relationship with said outer annular seat, said outer valve element threadedly connected to said inner valve element so that upon the relative rotation of said inner and outer valve elements said valve elements move longitudinally relative to each other;

a nose seal mounted within said inner bore end portion having a passageway in communication with the interior of the valve body when the lubricant fitting is connected to the valve body for allowing pressure within the interior of the valve body to enter said inner bore portion and act on said inner valve element thereby continuously urging it into a sealing relationship with said inner annular seat; and a spring compressively positioned between said inner valve element and said nose seal for continuously urging said inner valve element into a sealing relationship with said inner annular seat.

7. The lubricant fitting of claim 6 wherein said outer valve element includes a nipple receptor for receiving a nipple of a fluid injector and a port assembly communicating with said intermediate bore portion, said outer valve element may be selectively placed in a first position wherein said nipple receptor is not in fluid communication with said port assembly or a second position wherein said nipple receptor is in fluid communication with said port assembly, when said outer valve element is in said second position, said outer annular shoulder and said outer annular seat are spaced apart and said inner and outer valve elements may be moved inwardly towards the valve body to place said nipple receptor in communication with the interior of the valve body.

8. The lubricant fitting of claim 6 further comprising:
a safety cap detachably connected to said outer valve element, whereby a sealing relationship exists between said safety cap and said outer valve element.

* * * * *

UNITED STATES PATENT AND TRADEMARK OFFICE
CERTIFICATE OF CORRECTION

PATENT NO. : 4,351,414
DATED : September 28, 1982
INVENTOR(S) : Jeff L. Merten

It is certified that error appears in the above-identified patent and that said Letters Patent are hereby corrected as shown below:

Column 1, line 37, after "pressures" and before "50 psi." insert -- ( --.
Column 2, line 35, change "28", second occurence, to -- 38 --.
Column 4, line 53, change "seats" to -- seat --.

Signed and Sealed this

Twenty-fourth Day of May 1983

[SEAL]

Attest:

DONALD J. QUIGG

Attesting Officer

Acting Commissioner of Patents and Trademar